（12） United States Patent
Martin et al.

(10) Patent No.: US 8,167,755 B2
(45) Date of Patent: May 1, 2012

(54) SIX-SPEED TRANSMISSION

(75) Inventors: Berthold Martin, Shelby Township, MI (US); Hussein A. Dourra, Bloomfield, MI (US); Charles J. Redinger, Macomb, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 983 days.

(21) Appl. No.: 12/135,694

(22) Filed: Jun. 9, 2008

(65) Prior Publication Data

US 2008/0312022 A1 Dec. 18, 2008

Related U.S. Application Data

(60) Provisional application No. 60/942,560, filed on Jun. 7, 2007.

(51) Int. Cl.
*F16H 31/00* (2006.01)
*F16H 3/62* (2006.01)
*F16H 57/08* (2006.01)

(52) U.S. Cl. ......... 475/116; 475/276; 475/277; 475/344

(58) Field of Classification Search .................. 475/116, 475/344
See application file for complete search history.

(56) References Cited

U.S. PATENT DOCUMENTS

| | | | | |
|---|---|---|---|---|
| 6,258,005 | B1 * | 7/2001 | Rohloff | 475/277 |
| 6,767,304 | B1 * | 7/2004 | Botosan et al. | 475/132 |
| 2006/0142106 | A1 * | 6/2006 | Dourra et al. | 475/116 |

* cited by examiner

*Primary Examiner* — Edwin A Young
(74) *Attorney, Agent, or Firm* — Ralph E. Smith

(57) ABSTRACT

One implementation of a six-speed transmission includes a first gearset including first and second planetary gearsets each having a number of teeth. The transmission also has a second gearset including a third planetary gearset operably associated with the first and second planetary gearsets. The third planetary gearset has an equal number of teeth with respect to one of the first and second planetary gearsets. The transmission also has a first plurality of shift elements operably associated with the first and second planetary gearsets, each of the first plurality of shift elements being movable between a released state and an applied state to selectively engage at least one of the first and second planetary gearsets. The transmission also has a second plurality of shift elements operably associated with the third planetary gearset, each of the second plurality of shift elements being movable between a released state and an applied state to selectively engage the third planetary gearset. The transmission also has a controller operably associated with the first plurality of shift elements and the second plurality of shift elements to selectively engage the first, second and third planetary gearsets.

8 Claims, 6 Drawing Sheets

| Transaxle Gear | Ratio to P/G | Overall Ratio | Main Box Gearset | Transfer Gears | Underdrive Assembly Gearset | Differential Gears |
|---|---|---|---|---|---|---|
| 1 | 3.904 | 13.409 | 2.842 | 0.946 | 1.452 | 3.435 |
| 2 | 2.688 | 9.233 | 2.842 | 0.946 | 1.000 | 3.435 |
| 3 | 2.161 | 7.423 | 1.573 | 0.946 | 1.452 | 3.435 |
| 4' | 1.488 | 5.111 | 1.573 | 0.946 | 1.000 | 3.435 |
| 4 | 1.374 | 4.719 | 1.000 | 0.946 | 1.452 | 3.435 |
| 5 | 0.946 | 3.250 | 1.000 | 0.946 | 1.000 | 3.435 |
| 6 | 0.652 | 2.240 | 0.689 | 0.946 | 1 | 3.435 |
| R | 3.041 | 10.446 | 2.214 | 0.946 | 1.452 | 3.435 |

3-2 double-swap
2-3
4-2 double-swap

US 8,167,755 B2

SIX-SPEED TRANSMISSION

CROSS REFERENCE TO RELATED APPLICATIONS

This application is claims the benefit of U.S. Provisional Application No. 60/942,560 filed Jun. 7, 2007.

TECHNICAL FIELD

The present invention relates generally to a transmission having both a main gear box and an underdrive assembly.

BACKGROUND

Conventional automatic transmissions include a torque converter that receives torque from an engine and planetary gearsets that receive torque from the torque converter. The planetary gearsets provide various gear ratios of torque and thus various drive speeds. Transmissions also typically include fluid pressure-operated, multi-plate drive or brake clutches and/or brake bands that are connected to the individual elements of the planetary gearsets in order to allow shifts between the various gear ratios. In addition, automatic transmissions may also include one-way clutches (i.e., overrunning clutches) that cooperate with the multi-plate clutches to optimize power shift control. Finally, typical transmissions include a controller for selectively applying and releasing elements to shift the gears.

The inventors have herein recognized a need to provide a transmission having a main drive assembly and an underdrive assembly that improves vehicle performance and has a modular design to reduce complexity of assembly.

SUMMARY

One implementation of a six-speed transmission has a first gearset including first and second planetary gearsets each having a number of teeth. The transmission also has a second gearset including a third planetary gearset operably associated with the first and second planetary gearsets. The third planetary gearset has an equal number of teeth with respect to one of the first and second planetary gearsets. The transmission further includes a first plurality of shift elements operably associated with the first and second planetary gearsets. Each of the first plurality of shift elements is movable between a released state and an applied state to selectively engage at least one of the first and second planetary gearsets. The transmission additionally has a second plurality of shift elements operably associated with the third planetary gearset. Each of the second plurality of shift elements is movable between a released state and an applied state to selectively engage the third planetary gearset. The transmission also has a controller operably associated with the first plurality of shift elements and the second plurality of shift elements to selectively engage the first, second and third planetary gearsets.

One implementation of a six-speed transaxle has a main box gearset including first and second planetary gearsets having a number of teeth. The transaxle also has an underdrive assembly including a third planetary gearset operably associated with the first and second planetary gearsets. The third planetary gearset has an equal number of teeth with respect to one of the first and second planetary gearsets. In addition, the transaxle further includes a first plurality of shift elements operably associated with the first and second planetary gearsets. Each of the first plurality of shift elements is movable between a released state and an applied state to selectively engage at least one of the first and second planetary gearsets. The transaxle additionally has a second plurality of shift elements operably associated with the third planetary gearset. Each of the second plurality of shift elements is movable between a released state and an applied state to selectively engage the third planetary gearset. The transaxle also has a differential centerline operably associated with the third planetary gearset. The transaxle further includes a controller operably associated with the first plurality of shift elements and the second plurality of shift elements to selectively engage the first, second and third planetary gearsets.

Another implementation of a six-speed transmission has a torque converter that is operably associated with an engine and defines a fluid chamber with an elliptical torus shape. The transmission additionally includes a first gearset operably associated with the torque converter. The first gearset includes first and second planetary gearsets having a number of teeth. The transmission further has a second gearset including a third planetary gearset operably associated with the first and second planetary gearsets. The third planetary gearset has an equal number of teeth with respect to one of the first and second planetary gearsets. Further, the transmission additionally includes a first plurality of shift elements operably associated with the first and second planetary gearsets. Each of the first plurality of shift elements is movable between a released state and an applied state to selectively engage at least one of the first and second planetary gearsets. The transmission also has a second plurality of shift elements operably associated with the third planetary gearset. Each of the second plurality of shift elements is movable between a released state and an applied state to selectively engage the third planetary gearset. The transmission further has a controller operably associated with the first plurality of shift elements and the second plurality of shift elements to selectively engage the first, second and third planetary gearsets.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
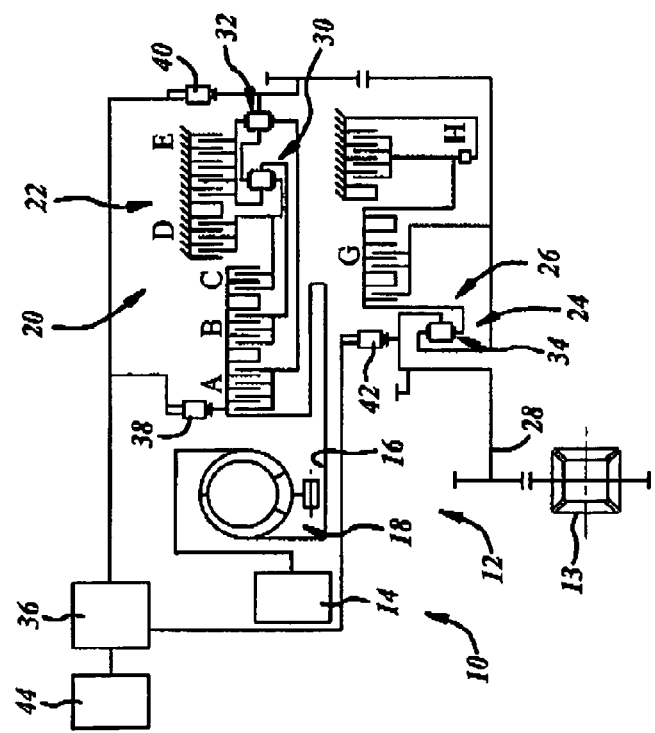
FIG. 1 is a schematic of a vehicle powertrain having a six speed transaxle, in accordance with one exemplary embodiment.
Figure 2:
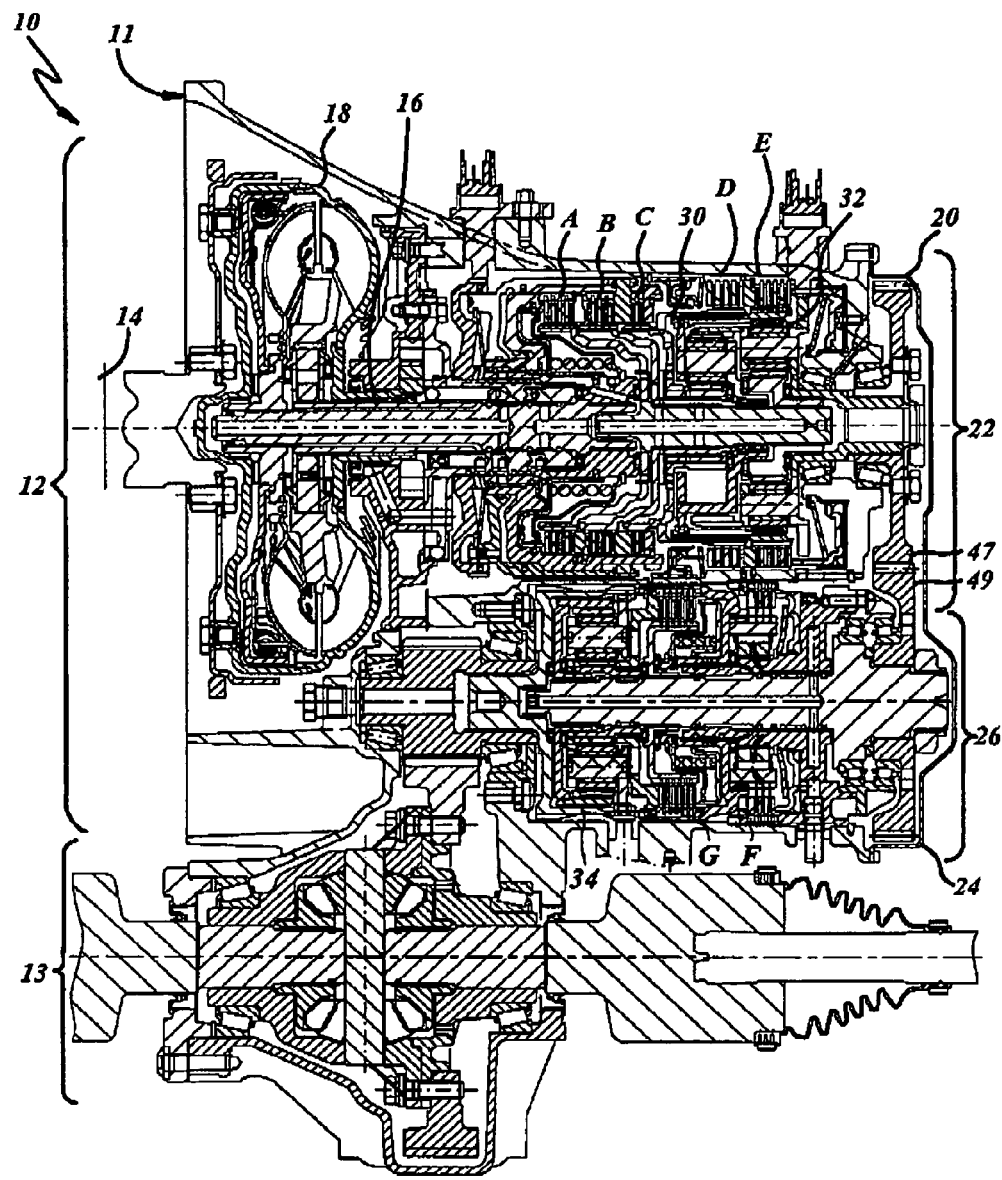
FIG. 2 is a cross-sectional view of the six-speed transaxle of FIG. 1.

Referring to the drawings in detail, FIGS. 1 and 2 illustrate an exemplary vehicle powertrain 10 including a six-speed transaxle 11 having an automatic transmission 12 and a differential gear 13 operably associated with the transmission 12.

Figure 3:
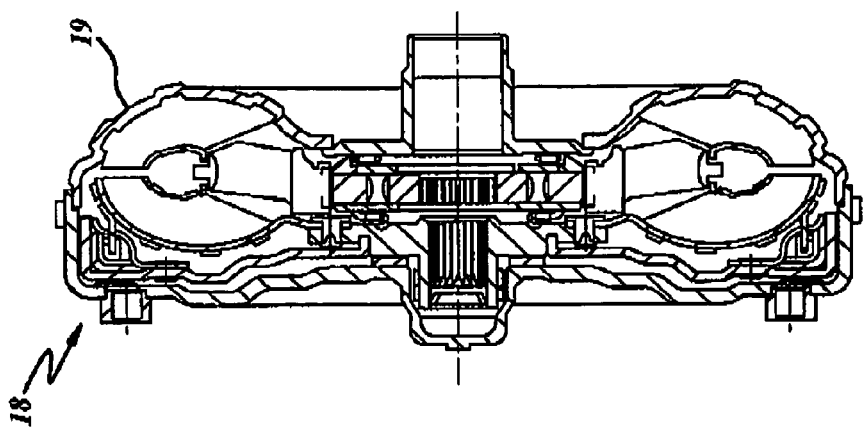
FIG. 3 is an enlarged cross-sectional view of the torque converter of FIG. 1.

As best shown in FIGS. 2 and 3, the transmission 12 may have a torque converter 18 and an input shaft 16 operably associated with an engine 14 via the torque converter 18 to transfer torque from the engine 14 to the input shaft 16. The torque converter 18 defines a fluid chamber 19 with an elliptical torus shape to sufficiently transfer engine torque while reducing an axial length of the transaxle 11. It will be appreciated that the torque converter 18 may have circular or various non-circular shapes.

Referring to FIG. 2, the transmission 12 may also have a main box 20 including a main gearset 22 operably associated with the input shaft 16, and an underdrive assembly 24 including an underdrive assembly gearset 26 operably associated with the main gearset 22. The main gearset 22 may include first and second planetary gearsets 30, 32 each having a number of teeth. The main gearset 22 may also have a plurality of hydraulically-actuated engagement or shift elements. These shift elements may include three drive clutches A, B, C, and two brake clutches D, E, which may be used to ground one or more gears of the planetary gearsets 30, 32 to the main box housing.

Figure 4:
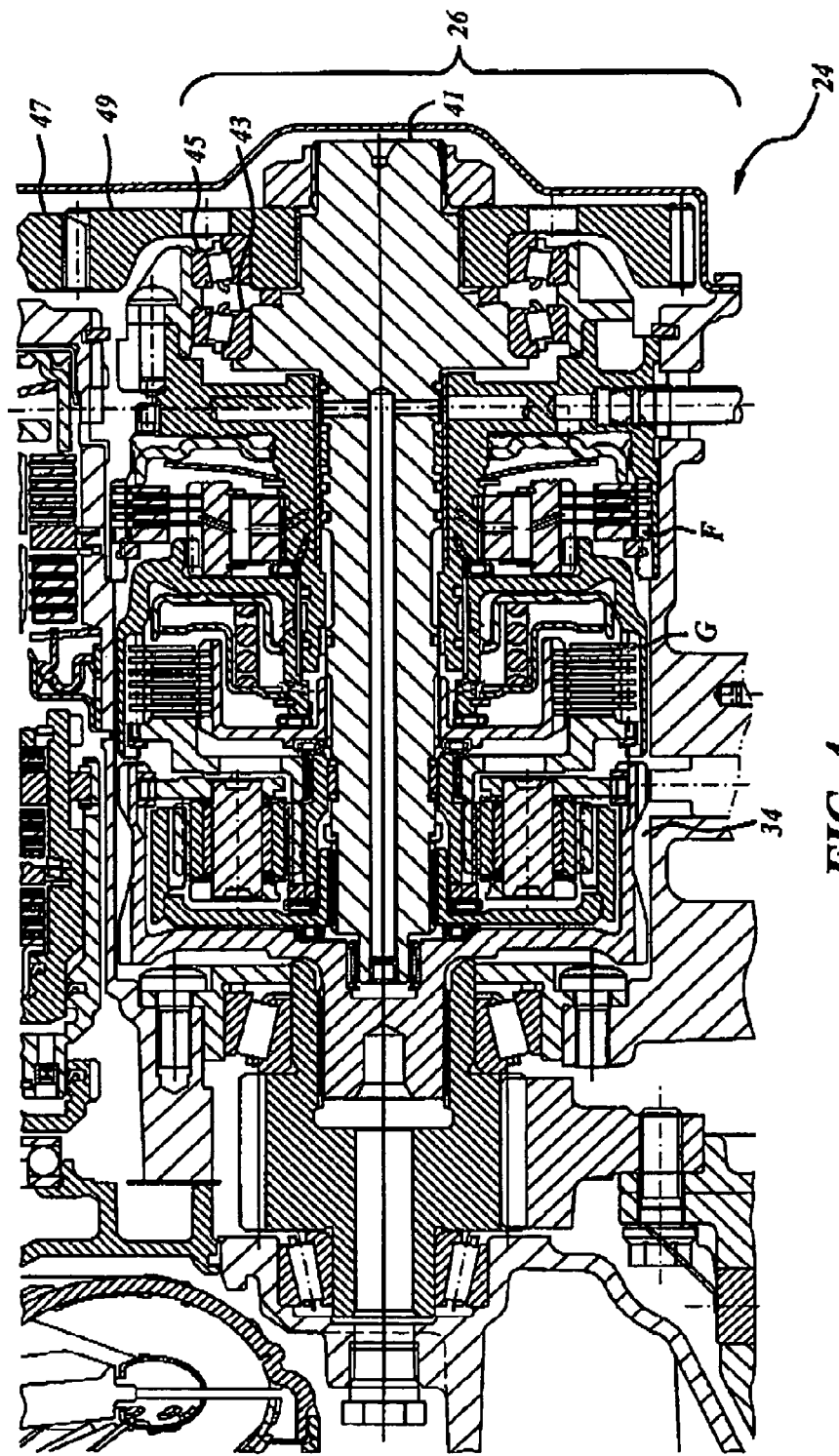
FIG. 4 is an enlarged cross-sectional view of the underdrive assembly of FIG. 1.

Referring to FIGS. 2 and 4, the underdrive assembly gearset 26 may include a third planetary gearset 34 having an identical number of teeth with respect to the first and second planetary gearsets. It will be appreciated that the common planetary gearsets may provide a modular design that can decrease the cost of manufacturing the transmission 12. The underdrive assembly gearset 26 may also include an intermediate shaft 41 and a pair of opposing taper bearings 43, 45 supporting the shaft 41 proximal to the transfer gears 47, 49. The compounder underdrive assembly gearset 26 may additionally have a plurality of hydraulically-actuated engagement elements including a braking clutch F, a drive clutch G, and an overrunning clutch H.

Figures 5, 6:
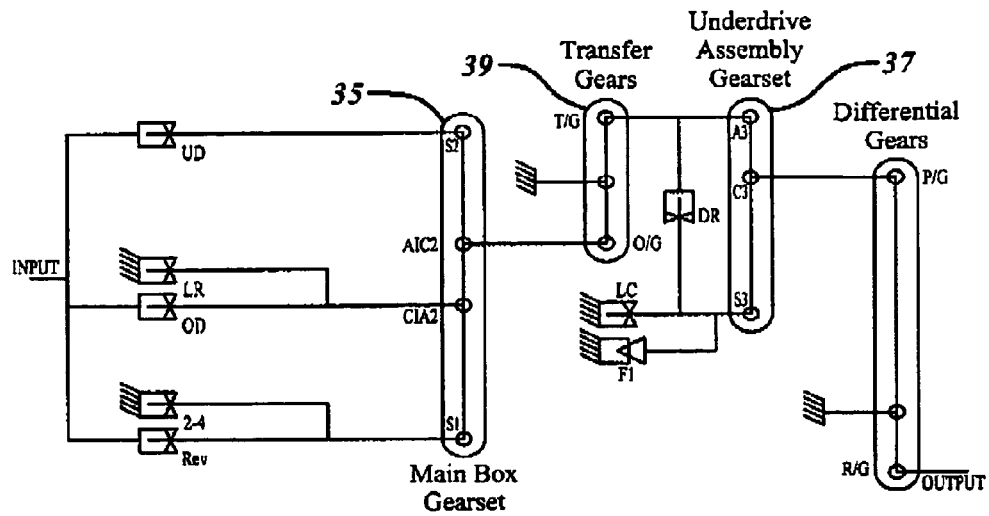
FIG. 5 is a lever diagram of the transaxle of FIG. 1.
FIG. 6 is a table illustrating the ratio construction of the transaxle of FIG. 1.

Referring to FIGS. 5 and 6, the transaxle 11 may provide a four-node lever 35 for the main box gearset 22, a three node lever 37 for the underdrive assembly gearset 26, and a set of transfer gears 39 operably associated between the levers 35, 37. The output is delivered from the three-node lever 37 to the final drive pinion gear. The four-node lever 35 provides four forward ratios while the three-node lever 37 yields two additional ratios, one of which is direct.

The combination of the two levers 35, 37 may provide eight forward ratios. However, two of these forward ratios are 1.000. One ratio is provided as a direct drive through the entire transaxle, and the other identical ratio is provided by the product of overdrive in the four-node lever and underdrive in the three-node lever. The latter result is a consequence of the identical tooth counts of the two operative planetary gearsets in the four and three-node levers 35, 37, respectively. Identical planetary gearsets 30 and 34 significantly reduce costs of producing the transaxle 11. Accordingly, the transaxle 11 may provide seven different forward ratios rather than eight. Similarly, two reverse ratios may be provided by combining the two levers 35, 37. However, the freewheel construction of the overrunning clutch H permits only one ratio, and direct drive in the underdrive assembly 37 is not permitted in reverse.

As shown in FIG. 6, when the underdrive assembly 24 is engaged, the underdrive assembly 24 multiplies the output ratio from the main box gearset 20 by 1.452. The increase in output ratio may significantly increase vehicle performance, such as acceleration and fuel economy. The transmission 12 may provide a ratio spread that is 45% greater than that provided by a conventional 4-speed transmission (i.e., 5.99 vs. 4.12). When the underdrive assembly 24 is disengaged, the underdrive assembly 24 may provide direct drive to the differential 13.

Figure 7:
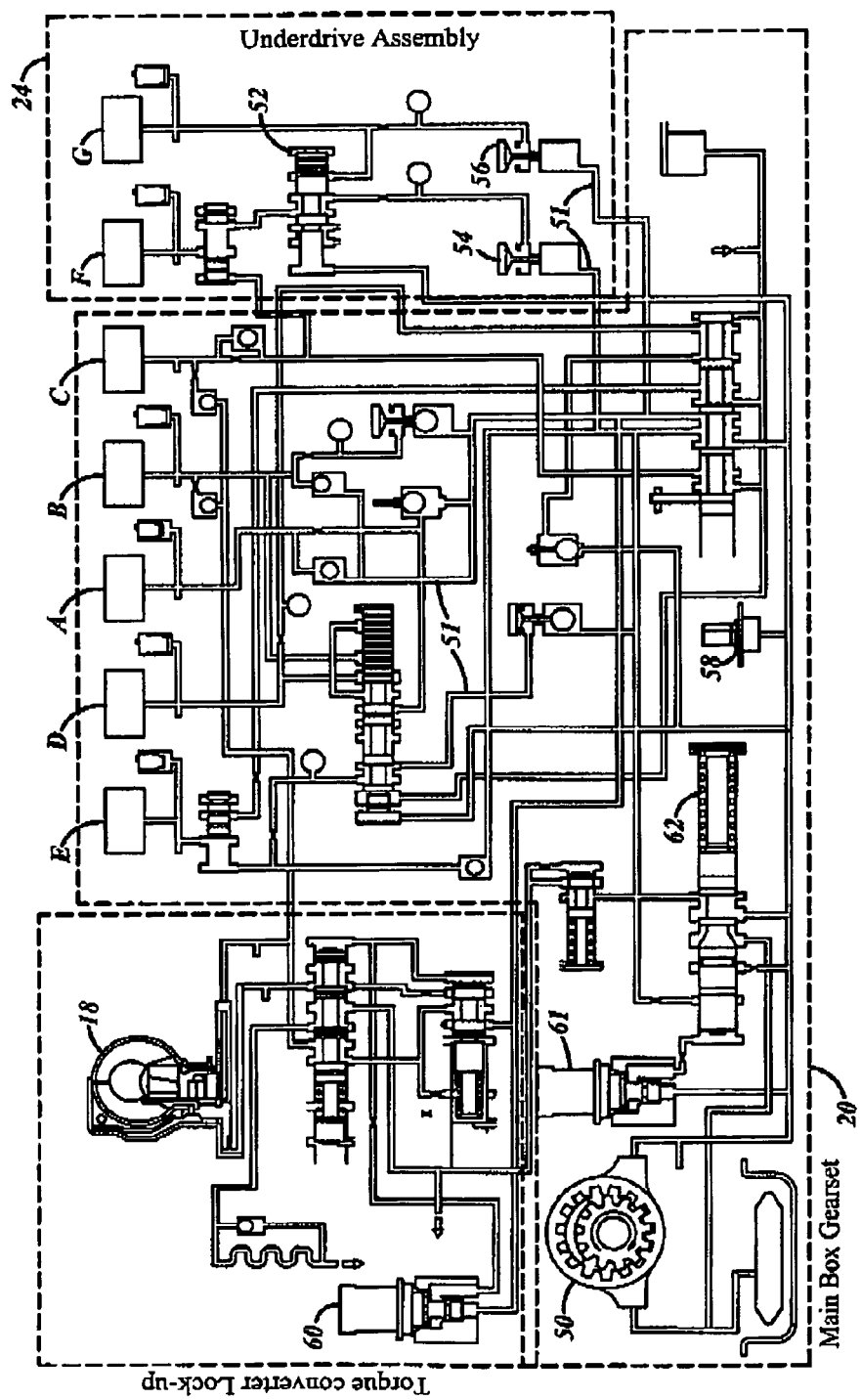
FIG. 7 is an electro-hydraulic schematic of the transaxle of FIG. 1.

As best shown in FIG. 7, the transaxle 11 may additionally include a controller 36, a pump 50 operably associated with the controller 36 and a plurality of lines 51 communicated from the pump 50 to the drive and/or braking clutches A-G. The transaxle 11 further includes a blocker valve 52 and two solenoids 54, 56 operably associated with one or more lines communicated with clutches F and G of the underdrive assembly 24. The controller is operably associated with the solenoids 54, 56 to induce the solenoids 54, 56 to move clutches F and G between released and applied states as detailed below in the discussion of FIG. 9.

The transmission may also have a circuit at the torque converter solenoid 60 to modify regulated pressure to adjust for changes In engine torque. This control is available in all forward gears. An orifice was used to provide lubrication to the underdrive assembly for ease of calibration. Accordingly, the transmission 12 has a parallel feed circuit independent of conventional cooler flow circuits for the transmission 12.

The transaxle 11 may further include a pressure transducer 58 associated with one of the lines 51 for generating a first signal indicative of line pressure. The transaxle 11 may also have a variable force solenoid 61 associated with the pressure transducer 58 and one or more of the lines 51 to receive the first signal from the pressure transducer 58. The variable force solenoid 61 may generate a second signal indicative of pressure output based on the first signal. The transaxle 11 may additionally include a regulator valve 62 associated with the variable force solenoid 61 and one or more of the lines 51 to receive the second signal from the variable force solenoid 61 and control line pressure to reduce parasitic losses. Accordingly, this system monitors clutch torque requirements and adjusts the pump pressure accordingly, using only what is necessary to prevent clutch slip. Typically, this is less than half of the available pressure. The use of the pressure transducer permits a further pressure reduction since the actual value of line pressure is known.

Figures 8, 9:
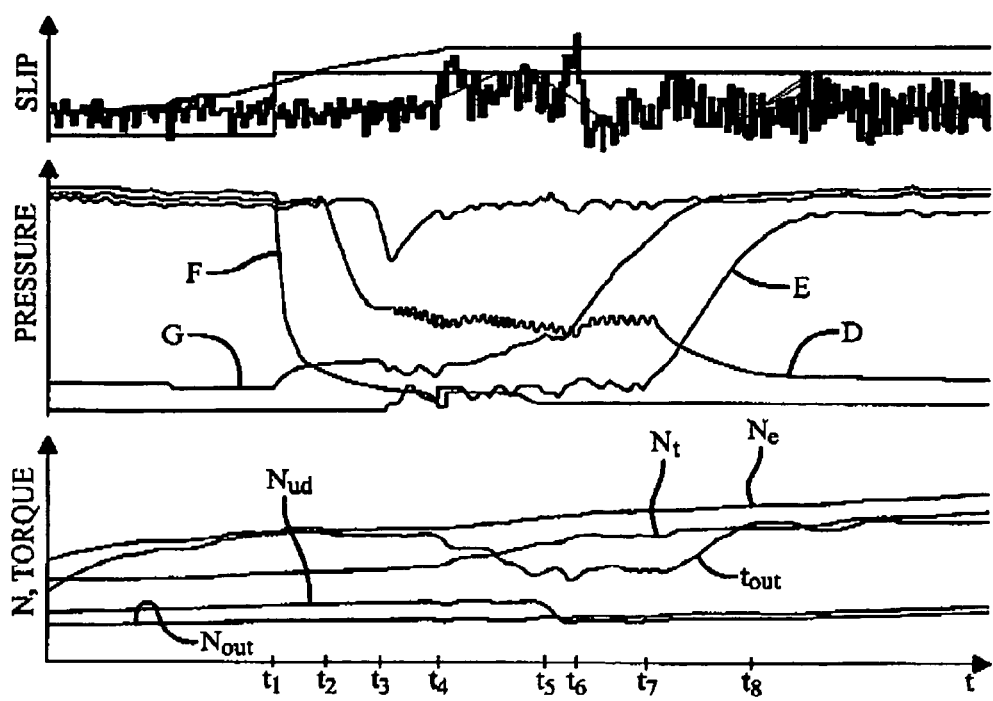
FIG. 8 is a table illustrating shift sequences for the transaxle of FIG. 1.
FIG. 9 is a graph illustrating a double swap downshift sequence between gear 3 and gear 2 for the six speed transaxle of FIG. 1, in accordance with one exemplary embodiment.

Referring to FIGS. 1, 6 and 8, in operation, the controller 36 receives signals generated by an input shaft speed sensor 38, a transfer speed sensor 40 that monitors a speed of rotation of an output of the main gearset 22, an output shaft speed sensor 42, and vehicle sensors 44 which preferably monitor other vehicle operating information including vehicle speed and operator input, such as braking and accelerator pedal position. While the invention contemplates any suitable manner by which the controller 36 selectively applies the drive and/or braking clutches A-G, in the exemplary powertrain 10, the controller 36 applies a given clutch A-G, by supplying a pulse-width modulated energizing signal to valve 61, which in turn controls the amount of torque that can be carried, if at all, by a given one of the clutches A-G. It will be appreciated that the controller chooses the proper gear depending on vehicle conditions such as the shift-program selected by the driver (i.e., Drive, Reverse, Neutral, etc.), the accelerator position, the engine condition, and the vehicle speed.

It is contemplated that the transmission 12 can instead have any suitable configuration of shift elements, such as drive clutches and brake clutches, to define the main gearset 22 and the compounder gearset 26 and selectively achieve a plurality of desired gear ratios with which to drive the transmission's output shaft 28.

The overrunning clutch H of the underdrive assembly 24 may carry torque only when the transmission 12 experiences a positive torque, such that, when the transmission 12 experiences negative torque, the overrunning clutch H is "overrun" so as to be effectively disengaged. Thus, for positive torque shifts, clutch F is released as the overrunning clutch H prevents any further relative rotation of the sun gear of the compounder's planetary gearset 34 and, hence, is not involved in the torque exchange during positive-torque shifts.

It will be appreciated that upshifting from gear 1 to gear 2, and downshifting from gear 2 back to gear 1, may both be provided in a "single swap". In particular, the gear ratio of the transmission 12 may be changed by "swapping" the underdrive assembly's drive clutch G for its brake clutch F while the underdrive assembly's overrun clutch H automatically releases. Thus, for example, an upshift from gear 1 to gear 2 may be provided as the controller 36 applies drive clutch G, whereupon the underdrive assembly's overrunning clutch H releases automatically as the torque applied by clutch G increases. The controller 36 may also release the underdrive assembly's brake clutch F, but its torque is zero since the overrunning clutch H is carrying all of the torque. After the speed change is complete, and with the underdrive assembly's drive clutch G fully engaged, the transmission 12 has shifted sequentially from gear 1 to gear 2 to achieve a numerically-lower gear ratio, with the upshift being accomplished entirely within the underdrive assembly 24.

As shown in FIG. 8, an upshift between gears 2 and 3 is a "double-swap" upshift, meaning that two clutches are released and two different clutches are applied in a coordinated manner to achieve to 2-3 upshift. Specifically, during an upshift from gear 2 to gear 3, the controller 36 begins to release drive clutch G as it fills and partially applies brake clutch D. Once brake clutch E has been released to the point at which the main box 20 has begun to "slip," the controller 36 disengages drive clutch G of the underdrive assembly 24 to allow the under assembly 24 to slip. A further detailed description of such a double-swap upshift is disclosed in U.S. Pat. No. 7,179,189, assigned to the assignee of the present invention, the disclosure of which is hereby incorporated by reference.

Thus, in the double-swap upshift from gear 2 to gear 3, the release of main box clutch E and the engagement of main box clutch D is timed by the controller 36 such that the exchange between brake clutch E and brake clutch D is slightly overlapped, for example, by adaptively adjusting the duty cycle controlling the hydraulic fluid supply solenoid valve to brake clutch E to maintain some excess torque-carrying capacity until the brake clutch D has enough capacity to hold engine torque, whereupon the main box 20 starts speed change the controller 36 drops the duty cycle for the supply solenoid valve to clutch E to zero to thereby release disengage brake clutch E. Then, in an exemplary transmission, generally about 40 to 70 milliseconds after the speed change has occurred in the main box 20 the controller 36 releases underdrive assembly direct clutch G in the underdrive assembly 24.

Referring to FIG. 9, in an exemplary "double-swap" downshift from gear 3 to gear 2 at time $t_1$, the controller 36 initially de-energizes the solenoid supply valve 54 controlling the fluid pressure to underdrive assembly brake clutch F (whereupon the overrunning clutch H continues to hold torque). The controller 36 also energizes the solenoid supply valve 56 controlling the fluid pressure to underdrive assembly direct clutch G, so as to "prefill" the direct clutch G. At time $t_2$, the underdrive assembly direct clutch G has been substantially prefilled, and the controller 36 de-energizes the solenoid supply valve controlling main box brake clutch D to thereby rapidly decrease or vent the fluid pressure applied to brake clutch D, until a desired pressure is achieved at time $t_3$ which is preferably a calibratable or adaptive value that is slightly above the pressure at which the brake clutch D begins to release or slip. The controller 36 then energizes the solenoid supply valve controlling main box brake clutch D, preferable with a duty cycle that has been adaptively determined so as gently reduced the pressure down to a slip condition, to thereby avoid a high jerk term. Also at roughly time $t_3$, the controller 36 energizes the solenoid supply valve controlling the fluid pressure to main box brake clutch E with a duty cycle sufficient to prefill main box brake clutch E.

At time $t_4$, with a speed change beginning to occur in the main box 20, the underdrive assembly 24 enters a torque-phase duty cycle mode in which the controller 36 begins to slowly increase the duty cycle of the solenoid supply valve 56 controlling underdrive assembly direct clutch G, to thereby raise the fill volume to a predetermined level. In an exemplary embodiment, the controller 36 operates in an open loop mode to achieve predetermined target fill volumes over time, until the underdrive assembly 24 begins to slip.

At time $t_5$, with the main box 20 slipping, and as the underdrive assembly 24 begins to slip, the controller 36 enters a main box "hold flow" mode in which the controller 36 energizes the solenoid supply valve controlling main box brake clutch D, preferably with a duty cycle that has been adaptively determined so as to generate a near-constant level of torque. At the same time, the controller 36 drops the duty cycle for solenoid supply valve 56 controlling underdrive assembly direct clutch G to an inertial phase, wherein the controller 34 achieves a compounder "zero flow" mode to maintain the fluid pressure at which the underdrive assembly 24 slips, i.e., a substantially flat pressure.

At time $t_6$, when the underdrive assembly's output speed $N_{ud}$ equals the target, output speed $N_{out}$, the controller 36 fully energizes the solenoid supply valve 56 controlling underdrive assembly direct clutch G. And, shortly thereafter, at time $t_7$, once the controller 36 has determined that underdrive assembly direct clutch G is "beyond fill," for example, as when the pressure of the direct clutch G is nearly equal to the line (supply) pressure, the controller 36 fully energizes main box brake clutch E while de-energizing main box brake clutch D, to the thereby complete the downshift at time $t_8$.

From the foregoing, it will be appreciated that a double-swap downshift in accordance with the invention advantageously delays release of the first main box clutch until after the second underdrive assembly clutch has been prefilled, with the speed change of the underdrive assembly occurring with little jerk term during the speed change of the main box, and with the second main box clutch being fully applied only after the second underdrive assembly clutch has been fully applied.

While the above description constitutes the preferred embodiment, it will be appreciated that the invention is susceptible to modification, variation and change without departing from the proper scope and fair meaning of the subjoined claims. For example, while a double-swap downshift has been described in connection with downshifting the transmission 10 from gear 3 to gear 2, it will be appreciated that a double-swap downshift from gear 4 to gear 2 will be accomplished in a similar manner.

A new 6-speed transaxle has a technical advantage of providing a modular design with generally low complexity to decrease costs, provide double-swap shifts, improve vehicle performance and fuel economy.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A six-speed transmission, comprising:
a first gearset including first and second planetary gearsets each having a number of teeth;
a second gearset including a third planetary gearset operably associated with the first and second planetary gearsets, the third planetary gearset having an equal number of teeth with respect to one of the first and second planetary gearsets;
a first plurality of shift elements operably associated with the first and second planetary gearsets, each of the first plurality of shift elements being movable between a released state and an applied state to selectively engage at least one of the first and second planetary gearsets;
a second plurality of shift elements operably associated with the third planetary gearset, each of the second plurality of shift elements being movable between a released state and an applied state to selectively engage the third planetary gearset;
a controller operably associated with the first plurality of shift elements and the second plurality of shift elements to selectively engage the first, second and third planetary gearsets;
a pump operably associated with the controller;
a plurality of lines communicated from the pump to the first plurality of shift elements and the second plurality of shift elements; and
a blocker valve associated with at least one of the lines communicated from the pump to at least one of the second plurality of shift elements, the blocker valve being selectively opened to move at least one of the second plurality of shift elements between the released and applied states to prevent simultaneous inadvertent application of the second plurality of shift elements.

2. The six-speed transmission of claim 1 further comprising a first solenoid associated with one of the plurality of lines for selectively engaging one of the second plurality of shift elements.

3. The six-speed transmission of claim 2 further comprising a second solenoid associated with another of the plurality of lines to selectively engage another of the second plurality of shift elements.

4. The six-speed transmission of claim 2 further comprising a plurality of transfer gears operably associated between the first gearset and the second gearset to transfer torque therebetween.

5. The six-speed transmission of claim 1 wherein further comprising:
a pressure transducer associated with one of the plurality of lines, the pressure transducer generating a first signal;
a variable force solenoid associated with at least one of the plurality of lines, the variable force solenoid receiving the first signal from the pressure transducer and generating a second signal indicative of pressure output in response to the first signal; and
a regulator valve associated with one of the plurality of lines and receiving the second signal from the variable force solenoid to control line pressure and reduce parasitic losses.

6. A six-speed transaxle, comprising:
a main box gearset including first and second planetary gearsets having a number of teeth;
an underdrive assembly including a third planetary gearset operably associated with the first and second planetary gearsets, the third planetary gearset having an equal number of teeth with respect to one of the first and second planetary gearsets;
a first plurality of shift elements operably associated with the first and second planetary gearsets, each of the first plurality of shift elements being movable between a released state and an applied state to selectively engage at least one of the first and second planetary gearsets;
a second plurality of shift elements operably associated with the third planetary gearset, each of the second plurality of shift elements being movable between a released state and an applied state to selectively engage the third planetary gearset;
a controller operably associated with the first plurality of shift elements and the second plurality of shift elements to selectively engage the first, second and third planetary gearsets; and
a blocker valve associated with the controller, the blocker valve being selectively opened to move at least one of the second plurality of shift elements between the released and applied states to prevent simultaneous inadvertent application of the second plurality of shift elements.

7. The six-speed transaxle of claim 6, further comprising a plurality of transfer gears operably associated between the main box gearset and the underdrive assembly to transfer torque therebetween.

8. A six-speed transaxle, comprising:
a torque converter operably associated with an engine, the torque converter defining a fluid chamber with an elliptical torus shape;
a first gearset operably associated with the torque converter, the first gearset including first and second planetary gearsets having a number of teeth;
a second gearset including a third planetary gearset operably associated with the first and second planetary gearsets, the third planetary gearset having an equal number of teeth with respect to one of the first and second planetary gearsets;
a first plurality of shift elements operably associated with the first and second planetary gearsets each of the first plurality of shift elements being movable between a released state and an applied state to selectively engage at least one of the first and second planetary gearsets;
a second plurality of shift elements operably associated with the third planetary gearset, each of the second plurality of shift elements being movable between a released state and an applied state to selectively engage the third planetary gearset;
a controller operably associated with the first plurality of shift elements and the second plurality of shift elements to selectively engage the first second and third planetary gearsets
a pump operably associated with the controller;
a plurality of lines communicated from the pump to the first plurality of shift elements and the second plurality of shift elements; and
a blocker valve associated with at least one of the lines communicated from the pump to at least one of the second plurality of shift elements, the blocker valve being selectively opened to move at least one of the second plurality of shift elements between the released and applied states to prevent simultaneous inadvertent application of the second plurality of shift elements.

* * * * *